Dec. 20, 1949  P. A. NOXON  2,492,057

PRECESSION SYSTEM FOR DIRECTIONAL GYROSCOPES

Filed Feb. 16, 1948

INVENTOR.
PAUL A. NOXON
BY

Patented Dec. 20, 1949

2,492,057

UNITED STATES PATENT OFFICE 2,492,057

PRECESSION SYSTEM FOR DIRECTIONAL GYROSCOPES

Paul A. Noxon, Tenafly, N. J., assignor to Bendix Aviation Corporation, Teterboro, N. J., a corporation of Delaware Application February 16, 1948, Serial No. 8,576

2 Claims. (Cl. 74—5.43)

This invention relates to gyroscopic instruments and more particularly to improved torque exerting means applicable for use as a precession effecting means for controlling directional gyroscopes.

Directional gyroscopes are usually given three degrees of freedom so that they are uninfluenced by gravity or other acceleration forces. Such gyroscopes are usually mounted with a substantially horizontal spin axis, oscillatory about a second horizontal axis at right angles to the spin axis, and for turning about a vertical axis. The spin axis of a directional gyroscope has a tendency to become inclined to the horizontal in a relatively short time thereby diminishing the directive force of the gyroscope. To correct the departure of the gyroscope spin axis from its reference axis, an air jet from the rotor casing is directed against a wedge shaped member or blade mounted on the normally vertical ring. The reaction to the air jet causes a torque to be exerted which causes a precession of the gyroscope to correct the spin axis.

The present invention provides means for raising the efficiency of the air jet to increase the torque applied to the vertical axis of the ring whereby the spin axis of the gyroscope is returned more rapidly to the reference axis.

An object of this invention is to provide means for increasing the sensitivity of a directional gyroscope.

Another object of this invention is to provide improved torque exerting means to level the rotor case of a gyro instrument.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only, and are not to be construed as defining the limits of the invention.

In the drawings, wherein like reference numerals refer to like parts,

Figure 1:
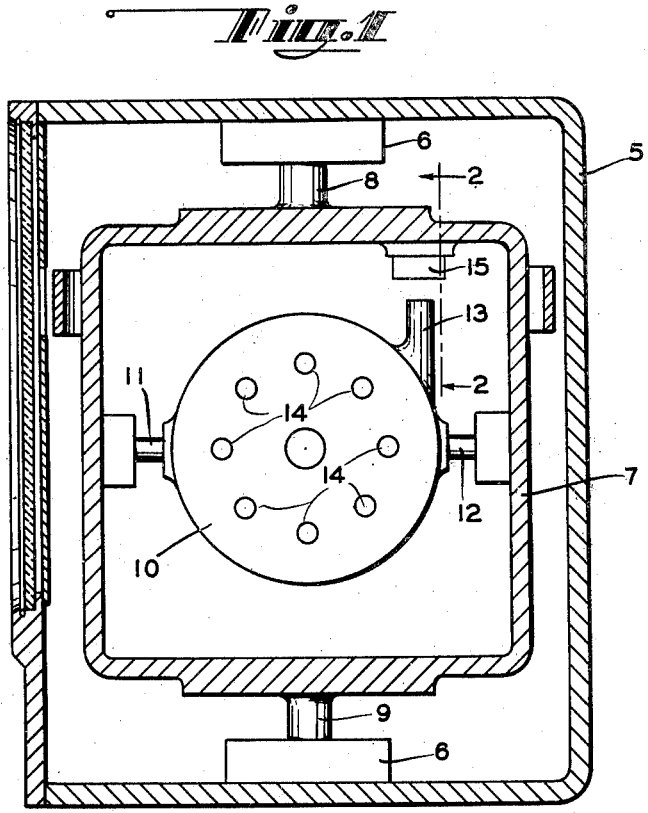
Figure 1 is a side elevation of a directional gyroscope in which my improved torque producing means has been incorporated.

The instrument in which this invention is illustratively embodied as shown in Figure 1 is an electrically spun directional gyroscope of the type which may or may not be slaved to or controlled from a remote magnetic compass. The illustrated instrument includes a sealed outer casing 5 having a shock-proof mounting 6 in which a conventional gimbal ring 7 is mounted for movement about a vertical axis formed by the respective upper and lower trunnions 8 and 9 journalled in suitable bearings (not shown) in the mounting 6. Gimbal ring 7 also supports the rotor bearing case 10 of the gyro instrument with freedom of movement about a horizontal axis provided by trunnions 11 and 12 extending from rotor bearing case 10 and suitable bearings (not shown) in the opposite legs of the said vertical ring. The gyro rotor (not shown) is suitably journalled within rotor bearing case 10, the spin axis of the gyro rotor being normally disposed at right angles to both the vertical axis of gimbal ring 7 and the horizontal axis of the rotor bearing case 10. The gyro rotor is spun by means of a polyphase motor (not shown) which is energized from a suitable source of electrical energy.

The rotor bearing case 10 is shown as pneumatically leveled by means of an air jet which issues from the tangentially directed nozzle 13 mounted on rotor bearing case. The bearing case 10 is provided with a plurality of openings 14 which in conjunction with gyro rotor provided with a plurality of slots (not shown) acts as a turbine pump to drive air through nozzle 13. The air jet is directed against a knife edge 15 mounted on the gimbal ring 7, the knife edge 15 normally bisecting the air jet from nozzle 13 when the rotor bearing case 10 is in a leveled position so that no disturbing torque is developed. In the event of inclination of rotor bearing case 10 about the axis 11—12, the air jet strikes only one side of the knife edge 15 whereupon a torque is developed about the vertical axis 8—9 of gimbal ring 7 to displace the gimbal ring in response to which the rotor bearing case 10 is precessed to its normal leveled position.

Previously, if the rotor bearing case 10 was tilted to such a degree that the air jet did not impinge on knife edge 15 but against the under side of gimbal ring 7, the air jet there functioned independently of knife edge 15 to exert a leveling torque about the vertical axis of gimbal ring 7. The horizontal component of the direct reaction of the air jet, which was present to some extent for small tilts, was effective to erect the gyroscope slowly without the aid of knife-edge 15.

Figure 2:
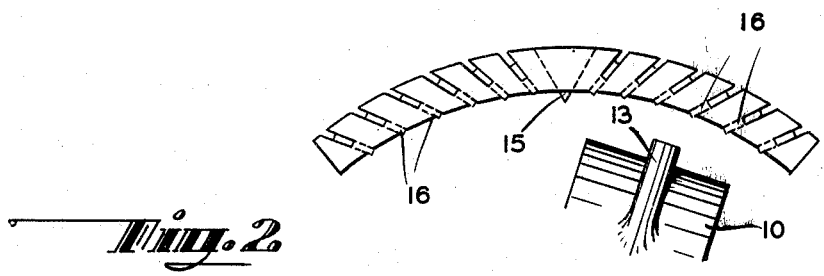
Figure 2 is a sectional view taken on line 2—2 when the rotor casing is tilted about its horizontal axis.

By affixing to the gimbal ring 7 a plurality of vanes 16 (Fig. 2) I increase the speed at which the case 10 is returned to its level position. The vanes 16 are disposed on both sides of the knife edge 15 and bear an angular relation with respect to the air jet from nozzle 13 that the vane surfaces are tangentially impinged. An increase in the horizontal component of the reaction to the air jet is thereby produced, increasing the torque applied to gimbal ring 7 about the vertical axis 8—9. The increased torque brings rotor bearing case 10 back to its leveled position more rapidly to prevent thereby the diminishing of the directive force of the directional gyroscope.

As will now be apparent to those skilled in the art, a novel and desirable improvement has been provided for the restoration and maintenance of the spin axis of a directional gyroscope in a leveled position so that its directive force may not be diminished.

Although but one embodiment of the invention has been illustrated and described in detail, various changes and modifications in the form and relative arrangement of the parts which will now appear to those skilled in the art, may be made without departing from the scope of the invention.

I claim:

1. In a directional gyroscope having a gyro rotor casing mounted for oscillation about a horizontal axis in a vertical gimbal ring rotatable about a vertical axis and precessional means including a sharp-edged deflecting means mounted on said vertical ring and a nozzle on the rotor casing for producing an air jet which reacts with said sharp edged deflecting means to exert a torque upon said vertical ring, the combination with said precessional means of means secured to said vertical gimbal ring and adapted to react with said air jet to increase the torque exerted upon the vertical gimbal ring about its vertical axis.

2. In a directional gyroscope having a gyro rotor casing mounted for oscillation about a horizontal axis in a vertical gimbal ring rotatable about a vertical axis and precessional means including a sharp-edged deflecting means mounted on said vertical ring and a nozzle on the rotor casing for producing an air jet which reacts with said sharp edged deflecting means to exert a torque upon said vertical ring, the combination with said precessional means of a plurality of vanes secured to said vertical gimbal ring on both sides of said deflecting means and adapted to react with said air jet to increase the torque exerted upon the vertical gimbal ring about its vertical axis.

PAUL A. NOXON.

REFERENCES CITED

The following references are of record in the file of this patent:

UNITED STATES PATENTS

| Number | Name | Date |
| --- | --- | --- |
| 1,197,134 | Leavitt | Sept. 5, 1916 |
| 2,174,777 | Carter et al. | Oct. 3, 1939 |
| 2,248,141 | Von Manteuffel | July 8, 1941 |